(12) United States Patent
Segsworth et al.

(10) Patent No.: US 9,746,633 B2
(45) Date of Patent: Aug. 29, 2017

(54) CLAMP AND BENDING STRAIN RELIEF APPARATUS AND METHODS

(71) Applicant: PGS Geophysical AS, Oslo (NO)

(72) Inventors: Matthew Segsworth, Austin, TX (US); Robert Alexis Peregrin Fernihough, Austin, TX (US); Jeremy Crane Smith, Austin, TX (US)

(73) Assignee: PGS Geophysical AS, Oslo (NO)

( * ) Notice: Subject to any disclaimer, the term of this patent is extended or adjusted under 35 U.S.C. 154(b) by 55 days.

(21) Appl. No.: 14/820,851

(22) Filed: Aug. 7, 2015

(65) Prior Publication Data

US 2016/0097910 A1 Apr. 7, 2016

Related U.S. Application Data

(60) Provisional application No. 62/059,493, filed on Oct. 3, 2014, provisional application No. 62/059,612, filed on Oct. 3, 2014.

(51) Int. Cl.
| | |
|---|---|
| *G02B 6/44* | (2006.01) |
| *G01V 1/38* | (2006.01) |
| *H02G 15/007* | (2006.01) |
| *G01V 1/18* | (2006.01) |
| *G01V 1/20* | (2006.01) |
| *H02G 9/02* | (2006.01) |
| *H02G 15/14* | (2006.01) |

(52) U.S. Cl.
CPC ............ *G02B 6/4478* (2013.01); *G01V 1/18* (2013.01); *G01V 1/201* (2013.01); *G01V 1/38* (2013.01); *G02B 6/4477* (2013.01); *H02G 15/007* (2013.01); *G02B 6/4427* (2013.01); *H02G 9/02* (2013.01); *H02G 15/14* (2013.01)

(58) Field of Classification Search
None
See application file for complete search history.

(56) References Cited

U.S. PATENT DOCUMENTS

| | | |
|---|---|---|
| 3,418,624 A | 12/1968 | Massa |
| 4,367,967 A | 1/1983 | Albert, Jr. |
| 4,722,590 A * | 2/1988 | Thomas ............... G02B 6/4448 385/107 |
| 5,647,046 A * | 7/1997 | Cowen ................. G02B 6/4422 385/136 |
| 6,108,274 A | 8/2000 | Pearce |
| 6,262,945 B1 | 7/2001 | Maples et al. |
| 6,314,056 B1 | 11/2001 | Bunn et al. |
| 6,606,186 B2 | 8/2003 | Maas |

(Continued)

FOREIGN PATENT DOCUMENTS

WO 2010040602 4/2010

OTHER PUBLICATIONS

European Search Report for related European Application No. 15187663.8, mailed Jun. 23, 2016 (11 pgs).

(Continued)

*Primary Examiner* — Hemang Sanghavi

(57) ABSTRACT

Clamp and Bending Strain Relief (BSR) system and method are disclosed. One example of a system can include a clamp coupled to a cable. The clamp is configured to couple an apparatus to the cable while allowing the cable to pass continuously through the clamp. A BSR apparatus is coupled to the clamp and the cable by a housing.

34 Claims, 14 Drawing Sheets

(56) References Cited

U.S. PATENT DOCUMENTS

| | | |
|---|---|---|
| 7,167,412 B2 | 1/2007 | Tenghamn |
| 7,222,534 B2 | 5/2007 | Maas et al. |
| 7,447,113 B2 | 11/2008 | Martinez et al. |
| 7,671,598 B2 | 3/2010 | Ronaess et al. |
| 8,424,847 B2 | 4/2013 | Scott |
| 8,611,180 B2 | 12/2013 | Berg et al. |
| 8,645,071 B2 | 2/2014 | Fernihough |
| 2003/0011878 A1 | 1/2003 | Maas et al. |
| 2006/0117874 A1 | 6/2006 | Goujon et al. |
| 2006/0227656 A1* | 10/2006 | Berg .................. G01V 1/201 367/15 |
| 2010/0226203 A1 | 9/2010 | Buttle et al. |
| 2012/0250457 A1 | 10/2012 | Rickert et al. |
| 2013/0028051 A1 | 1/2013 | Barkved et al. |
| 2014/0046599 A1 | 2/2014 | Smith et al. |
| 2014/0104982 A1 | 4/2014 | Berg et al. |
| 2014/0112094 A1 | 4/2014 | Fernihough |
| 2014/0160885 A1 | 6/2014 | Tenghamn |
| 2014/0185409 A1 | 7/2014 | Voldsbekk |
| 2014/0185410 A1 | 7/2014 | Voldsbekk |
| 2014/0185411 A1 | 7/2014 | Voldsbekk |
| 2014/0185412 A1 | 7/2014 | Voldsbekk |
| 2014/0238773 A1 | 8/2014 | Sallas et al. |
| 2014/0254310 A1 | 9/2014 | Voldsbekk |
| 2015/0043310 A1* | 2/2015 | Maas .................. G01V 1/201 367/188 |

OTHER PUBLICATIONS

Arkema Innovative Chemistry, "Paints and coatings / Delivering Innovative Products and Services to Coatings Formulators Worldwide," Arkema Innovative Chemistry, www.arkema.com, 12 pgs, [retrieved on Jul. 18, 2014 from the Internet <URL: http://www.arkema.com/export/shared/.content/media/downloads/products-documentations/coatings/arkema-global-coatings-offer-2014.pdf>].

Dupont—Hytrel HTR8351 NC021 (Preliminary Data), "Thermoplastic Polyester Elastomer", DuPont, www.dupont.com, Revised Oct. 8, 2013, 2 pgs., [retrieved on Jul. 18, 2014 from the Internet <URL: http://dupont.materialdatacenter.com/profiler/material/pdf/datasheet/HytrelHTR8351NC021>].

Crompton Corp., "Polymer Modifiers—Polybond 3200 Chemically Modified Polyolefin," Crompton—Olefins & Styrenics, www.cromptoncorp.com, Revised Oct. 5, 2004, 2 pgs.

Crompton Corp., "Polymer Modifiers—Polybond 3000 Chemically Modified Polyolefin," Crompton—Olefins & Styrenics, www.cromptoncorp.com, Revised Oct. 5, 2004.

U.S. Appl. No. 14/452,211, filed Aug. 5, 2014, Titled: "Subsea Cable Having Floodable Optical Fiber Conduit" (16 pgs).

* cited by examiner

CLAMP AND BENDING STRAIN RELIEF APPARATUS AND METHODS

CROSS-REFERENCE TO RELATED APPLICATIONS

This application claims priority to U.S. Provisional Applications 62/059,612 and 62/059,493, filed Oct. 3, 2014, which are incorporated by reference.

BACKGROUND

In the past few decades, the petroleum industry has invested heavily in the development of marine seismic survey techniques that yield knowledge of subterranean formations beneath a body of water in order to find and extract valuable mineral resources, such as oil. High-resolution seismic images of a subterranean formation are helpful for quantitative seismic interpretation and improved reservoir monitoring.

Permanent (hydrocarbon) reservoir monitoring (PRM) is a technique where multiple three-dimensional seismic "pictures" of the state of a hydrocarbon reservoir are taken such that a geologist or reservoir engineer may plan the location of additional boreholes for increasing the efficiency of the hydrocarbon extraction and/or may assess the efficiency of the current extraction techniques over time. In some cases, taking multiple seismic pictures of a hydrocarbon reservoir may be referred to as four-dimensional seismic.

For a typical PRM system, the system measures and records well performance and reservoir behavior from seismic sensors placed on the seafloor. Measurements are collected from permanently installed ocean bottom seismic cable systems.

A PRM system may utilize optical devices to sense parameters such as acceleration, motion and/or pressure, among others. For instance, optical devices can be used to sense seismic energy. The seismic energy may be naturally occurring, or may be imparted by a seismic energy source for the purpose of performing seismic surveys, geophysical exploration, and/or PRM, for example.

Marine-based PRM faces significant challenges that are not faced by land-based reservoir monitoring systems. This is particularly true of ocean bottom installations as water depths extend into the 1000 meter range and beyond. For purposes of seismic surveying, geophysical exploration, and/or PRM, cables may be retrieved or deployed using a pulley or capstan. Marine-based PRM equipment may therefore advantageously flex to conform to a capstan profile.

DETAILED DESCRIPTION

Figure 1:
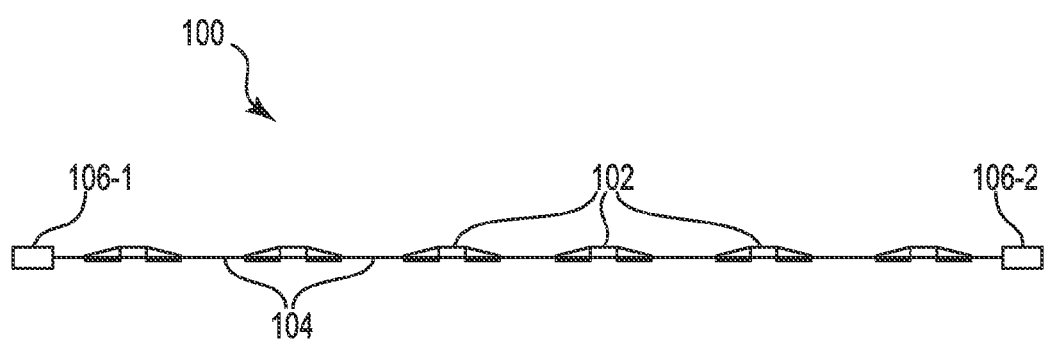
FIG. 1 illustrates an example of one or more sensor stations having a clamp and bending strain relief (BSR) apparatus configured to be located on a seafloor for use in PRM.

Systems and methods are provided for a clamp and Bending Strain Relief (BSR) apparatus. The disclosed clamp and BSR apparatus and methods can effectively attach apparatus to cables while protecting those apparatus and cables. The cables can include optical fiber cables, in some examples. As used herein, cables, optical fiber cables, clamps, housings, sensor stations, BSR apparatus, devices, structures and/or components associated with a BSR apparatus are described. Each may be referred to separately as an "apparatus". The term "system" as used herein is intended to mean one or more apparatus coupled together to achieve a particular function.

Additionally, the disclosed clamp and BSR apparatus may reduce material costs and/or fabrication times, among other benefits as compared to other clamps and BSR apparatus and methods.

Typical techniques to attach apparatus to cables include the use of a conical potted termination cone that transfers cable weight and tensile cable forces to another structure. This use of a conical potted termination cone in prior techniques encases individual cable wires at the end of a length of cable in an epoxy or cast metal potting inside the cone structure. The potting and cone structure can bear the cable forces and allow the cable to be attached to other apparatus in field use and assembling. However, the typical conical potted termination cone technique involves having to cut a length of the cable at each termination location. Additionally, the permanent nature of an epoxy or cast metal potting makes accessing and servicing connections and apparatus coupled to the cable difficult as some ocean bottom seismic cable systems, such as those used in PRM systems, include pressure-bearing tubes and housings, as well as cables fully terminated at sensor stations within the PRM system.

In contrast, examples of the present disclosure include a clamp to couple a cable to another apparatus. The clamp embodiments described herein may be less expensive as compared to other cable attachment mechanisms. In at least one embodiment, the clamp is removable and allows segments of the cable to continue, uninterrupted through the clamp. For example, the clamp may be configured to couple an apparatus to the cable while allowing the cable to pass continuously through the clamp and/or through a BSR apparatus. That is, the cable does not have to be cut at along a length of the cable at each termination location. In some examples, the clamp can have a higher coupling strength between an apparatus and an exterior surface of the cable than other attachment techniques.

In some embodiments the clamp may be removable from the cable without damage during assembling to an apparatus or during in-field use and servicing. As used herein, the term damage is intended to mean a detrimental impact to or reduction in a cable, apparatus and/or system's intended function and use. As such, the removable clamp may reduce labor time, assembling and servicing costs, and potentially allow the clamps to be reused, saving material and replacement costs. Embodiments of the clamp may also allow for easier access to the cable (e.g., servicing). For example, in at least one embodiment, optical fibers within a cable may be more easily accessed as compared to other attachment mechanisms and techniques. That is, the optical fibers within the cable may be accessible without having to open a hermetic seal, hermetically reseal, or reconstitute optical fibers (e.g., enclose optical fibers in a reconstituted tube). A reconstituted tube may include a reconstituted tube or cable as discussed in applications 62/202,247, 62/202,198, and 62/202,260.

Some approaches to BSR apparatus design include assembling the BSR apparatus and/or attaching the BSR apparatus to other apparatus by use of bolts or screws. These bolts or screws can be expensive and heavy, and may add to the weight and cost of the BSR apparatus.

In contrast, BSR apparatus, in accordance with the present disclosure, may be less expensive, less heavy, and less complex to assemble as compared to previous techniques. In at least one embodiment, similar to the above described clamp, the BSR apparatus may be removable. That is, the BSR apparatus can be removed from a cable without damage during assembling or in field use repairs, thus reducing labor time, costs, and may even be reused, potentially saving replacement material costs. In addition, a manner in which the BSR apparatus described herein can be assembled and/or disassembled may reduce and/or avoid the use of expensive and complex tools.

Embodiments and advantages described herein with reference to a "cable" may be equally achievable and advantageous when used with a marine geophysical prospecting cable, such as may be used with ocean bottom sensor cables or with towed sensor cables (streamers). Consequently, as used herein, "cable" should be read to refer equally to a towed sensor cable as well as to an ocean bottom sensor cable.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly coupled.

The figures herein follow a numbering convention in which the first digit or digits correspond to the drawing figure number and the remaining digits identify an element or component in the drawing. Similar elements or components between different figures may be identified by the use of similar digits. For instance, 102 may reference element "02" in FIG. 1, and a similar element may be references as 202 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 illustrates an array 100 of sensor stations 102 located on a seafloor for use in permanent reservoir monitoring (PRM). Sensor stations 102 may include a clamp and BSR apparatus according to embodiments described herein. As used herein, "sensor stations 102" refers to one, some, or all of the sensor stations illustrated in FIG. 1. An array of sensor stations may be located on a seafloor and may include more or less sensor stations than illustrated in FIG. 1. Optical and mechanical apparatus and/or systems, disclosed herein, may be deployed on the seafloor for PRM in connection with sensor stations 102. Mechanical apparatus may include clamps and BSR apparatus as described herein. Optical apparatus may include an optical interferometer device (also referred to as interferometer optics), an optical accelerometer, a splice module, a splice management tray, an optical telemetry block, and an optical hydrophone, among other possible optical apparatus for use in seismic sensing.

PRM can include monitoring of hydrocarbon, e.g., oil and/or gas, fluid flows; geological formations and their associated seismic events, as well as injection processes, for example. "Seafloor", as used herein, refers to the floor of a body of water, such as an ocean, a sea, or a lake, for example. The body of water can be a salt-water body of water, a fresh-water body of water, or a brackish body of water.

Sensor stations 102 may be coupled to a number of other sensor stations 102 by cable 104 to form array 100. Connection modules 106-1 and 106-2 can couple cable 104 and sensor stations 102 to other apparatus of a sensor system, in some instances. As an example, array 100 may include twenty-eight marine sensor stations each having approximately one hundred meters of cable between one another. In some instances, this length may be consistent between sensor stations 102, and in other instances, this length may vary. The length may be 25 meters, 50 meters, 100 meters, and/or 200 meters, among others.

A sensor station 102 may have a minimum bend radius from around 1 to 2 meters, may have a continuous wire rope core, and may have an overall strength from around 80 to 110 kilonewtons. In at least one example, the minimum bend radius is 1.25 meters, and the overall strength is 94 kilonewtons. Cable 104 can have a diameter from around 10 to 30 millimeters, for instance it may be 20.7 millimeters. In some embodiments of the present disclosure, PRM can be provided for deep water operations, can have a 25-year or longer life, and can provide four-dimensional processing and interpretation. Embodiments, however, are not limited to these examples.

FIGS. 2A-2H illustrate example views of a sensor station 202 including a clamp 210 and a BSR apparatus 208. Sensor station 202 can be located on a seafloor as a part of an array of sensor stations within a PRM system and can be deployed on a seafloor for PRM in some embodiments. In some embodiments, sensor station 202 may be from around 1,000 to 2,000 millimeters in length. In one embodiment, it may be 1,520 millimeters in length.

Figure 2A:
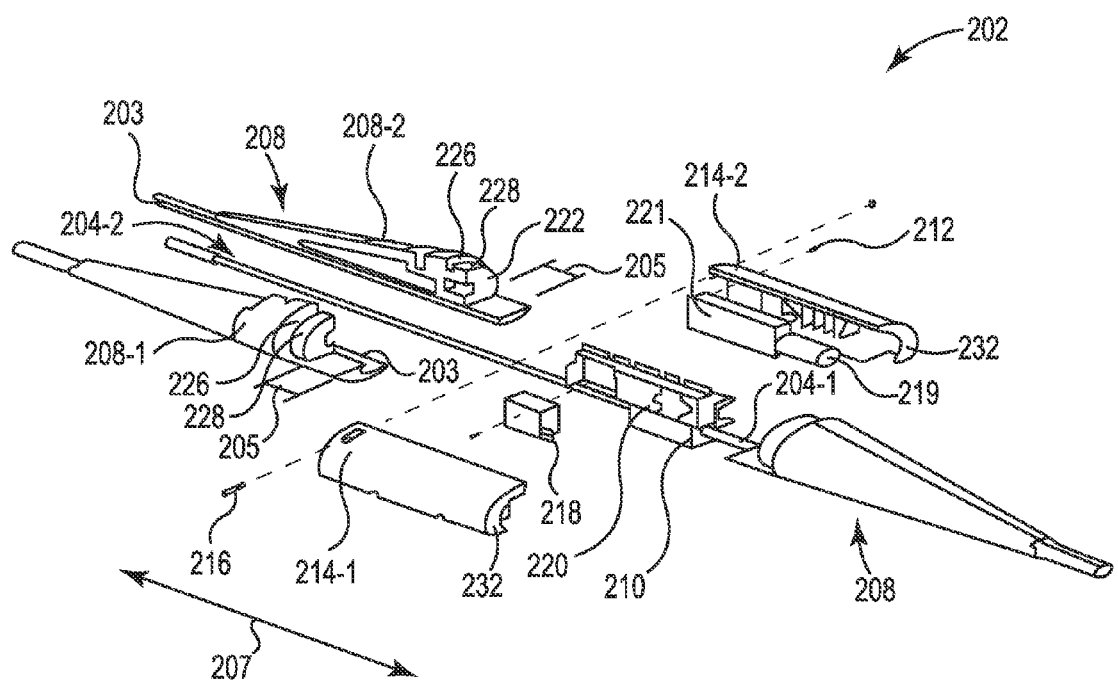
FIGS. 2A-2H illustrate example views of portions of a sensor station including a clamp and a bending strain relief (BSR) apparatus.

FIG. 2A illustrates an exploded view of sensor station 202. Sensor station 202 can be coupled around sections of cable 204-1 and 204-2 (collectively referred to as cable 204). Cable sections 204-1 and 204-2 may contain a number of portions that include optical fibers. In some embodiments, cable sections 204-1 and 204-2 can include a cable section that does not have a reconstituted portion along its length (non-reconstituted cable section) and a cable section that does have a reconstituted portion along its length. In this example, cable section 204-1 is illustrated as a non-reconstituted section and may include optical fibers enclosed within a tube, such as a steel protective tube. Cable section 204-2 is illustrated having a reconstituted portion along its length and may include optical fibers within a reconstituted tube. In some instances, the reconstituted tube can be a steel tube. In some embodiments, a non-reconstituted tube can be a plastic tube or a composite material thereof.

Clamp 210, as will be discussed further herein, can couple apparatus, such as apparatus associated with a sensor station, to a cable 204. In some embodiments, the clamp 210 can couple sensor station apparatus to a cable 204 by allowing access to some of the optical fibers within the cable 204 and/or providing attachment mechanisms on the clamp 210. Sensor station apparatus can include, for instance, an optical fiber splice management tray 220, a splice module, an optical telemetry block 218, and an optical hydrophone 219 and sensor box 221, etc. (e.g., as part of a sensor package). More or fewer apparatus than those illustrated in FIG. 2A may be coupled to a cable 204 via clamp 210.

A housing, made up of sections 214-1 and 214-2 (the housing will be collectively referred to as 214), may also couple to the clamp 210, the cable 204, and enclose the apparatus, such as optical telemetry block 218, optical hydrophone 219, splice management tray 220, etc. That is, in some embodiments, sensor station 202 can include housing sections 214-1 and 214-2 (also referred to as "first" and "second" sections of the housing and/or "housing sections") that, when joined, form a housing enclosure and may be attached to and/or enclose various apparatus of sensor station 202. As used herein, "enclose" refers to defining a boundary surface encompassing a volume. As used herein, a structure that encloses may partially or fully cover the boundary surface. In some embodiments, a structure that encloses may provide a supportive framework for apparatus within the volume. The housing sections 214-1 and 214-2 can be joined by attachment members 212 and 216. In some embodiments, the attachment members 212 and 216 can include bolts and/or screws.

According to at least one embodiment, the housing sections 214-1 and 214-2 couple to a BSR apparatus and enclose the clamp 210 and cable 204 in a manner to reduce and/or restrict movement between the BSR apparatus and the housing 214. As used herein, restricting movement comprises preventing the BSR apparatus from moving away from the housing 214. Restricting movement also comprises allowing a predetermined range of travel laterally and/or longitudinally. The BSR apparatus can include a plurality of sections (the BSR apparatus will be collectively referred to as 208). In the example shown in FIG. 2A, the BSR apparatus is shown having BSR apparatus sections 208-1 and 208-2 (also referred to herein as "first" and "second" sections of the BSR apparatus and/or "BSR apparatus sections"). In the example shown in FIG. 2A, a first BSR apparatus section 208-1 may be coupled around one side of a cable 204 on at least one side of the clamp 210 and a second BSR apparatus section 208-2 may be coupled around another side of the cable 204 on the same side of the clamp 210.

As shown in FIG. 2A, the BSR apparatus can include a cable cavity 203 positioned along a longitudinal axis (indicated by arrow 207) of the BSR apparatus 208 near a bottom surface of the BSR apparatus 208. The cable cavity 203 can be configured to enclose a longitudinal length of cable 204. The BSR apparatus can be configured with an open section 205 of free space for a length along the longitudinal axis 207. As used herein, "free space" refers to at least a portion of an interior volume that is not otherwise occupied by structure or apparatus, but may otherwise be occupied by gas or fluid. Free space may also sometimes be referred to as "interstitial space". In one or more embodiments the open section 205 may be configured to receive one or more apparatus to couple with the cable 204. In at least one embodiment, the apparatus may include optical apparatus associated with a sensor station to a PRM system. The housing sections 214-1 and 214-2 may act as an outer structure to the open section 205 of the BSR apparatus 208.

As described in more detail below, the housing sections 214-1 and 214-2 may couple to the BSR apparatus 208 at an end of the open section 205.

According to an embodiment, the BSR apparatus 208 can include a groove 226. The housing sections 214-1 and 214-2 can couple to the BSR apparatus 208 using this groove 226. In the example shown in FIG. 2A, the groove 226 is located in an exterior surface of the BSR apparatus 208 with an orientation that is transverse to the longitudinal axis 207. In at least one embodiment as shown in the example of FIG. 2A, the groove 226 is formed as a partial annulus in the exterior surface of the BSR apparatus 208. As shown, the groove 226 may terminate before reaching an area where the cable cavity 203 is located. Housing sections 214-1 and 214-2 may serve as an outer structure that extends between the opposite ends of the open section 205 to enclose the free space of the open section 205. The housing sections 214-1 and 214-2 may also have a flange 232 on an end of a respective housing section 214-1 and 214-2 to engage the groove 226 on the BSR apparatus 208. In at least one embodiment the flange 232 may extend radially inward and be configured to engage with the groove 226 of the BSR apparatus 208.

In FIG. 2A, two example BSR apparatus are shown, one on each side of the clamp 210, along the longitudinal axis 207 direction. Each BSR apparatus may be formed from one or more sections. For example, each BSR apparatus may be formed from two BSR apparatus sections 208-1 and 208-2. The two sections may be aligned along the longitudinal axis 207 to form the cable cavity 203. That is, when the two BSR apparatus sections 208-1 and 208-2 are joined together, the two BSR apparatus sections 208-1 and 208-2 may form the cable cavity 203.

As shown in the example of FIG. 2A, the housing may be formed from housing sections 214-1 and 214-2 that when coupled together form an outer structure that extend longitudinally between the opposite ends of the open section 205 and along a partial circumference of the open section 205. The partial circumference of the housing sections 214-1 and 214-2 may at least partially enclose the open section 205. In at least one embodiment the flange 232 on an end of the housing sections 214-1 and 214-2 corresponds to the partial annulus of the groove 226. The two housing sections 214-1 and 214-2 can be configured to be coupled to the BSR apparatus 208 to reduce unwanted twisting while allowing for the restricted movement described above of the BSR apparatus 208. In at least one embodiment, the groove 226 is a shared partial annulus groove 226 on an exterior surface of each BSR apparatus section 208-1 and 208-2 adjacent to the open section 205.

Figure 2B:
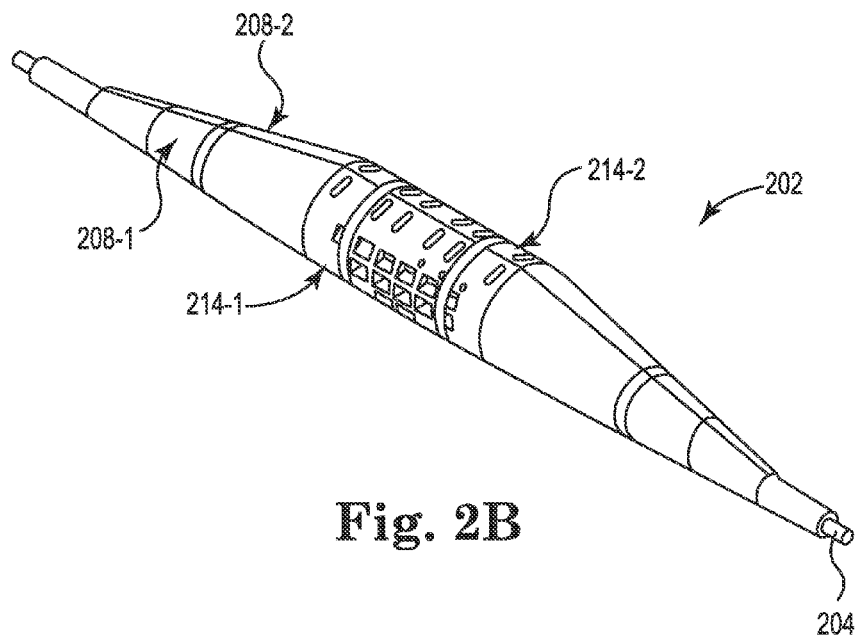

FIG. 2B illustrates an example perspective view of sensor station 202. Sensor station 202 as illustrated in FIG. 2B includes a BSR apparatus 208, including BSR apparatus sections 208-1 and 208-2, coupled to a housing 214, including housing sections 214-1 and 214-2. The housing sections 214-1 and 214-2 enclose the clamp (not shown) and cable 204. According to various embodiments the BSR apparatus 208 and housing 214 may be attachable to clamp (not shown), holding the BSR apparatus 208 and housing 214 along the cable 204.

Figure 2C:
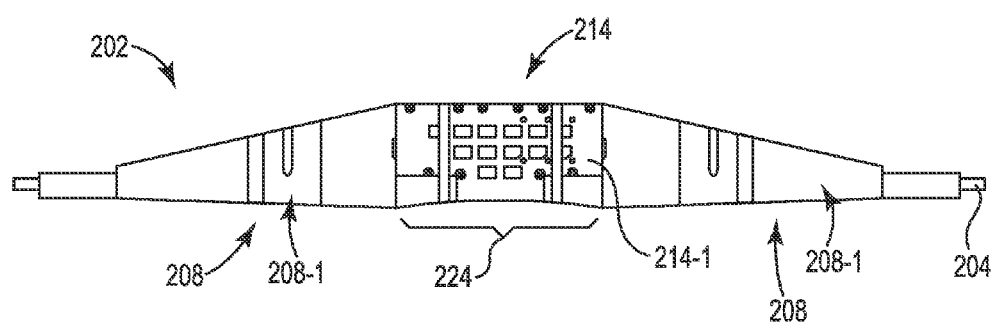

FIG. 2C illustrates an example side view of the sensor station 202 from a side in which BSR apparatus section 208-1 and housing section 214-1 is visible and coupled around the cable 204. As shown in the example side view of the sensor station, the housing sections 214-1 (shown) and 214-2 (not shown) may have a curved profile 224 to facilitate bending over machines, capstans, cable reels, and/or cable sheaves. For instance, a bottom portion of housing section 214-1 and housing section 214-2 can each have a curved profile such that when housing sections 214-1 and 214-2 are coupled together the bottom portions of the first and the second housing sections 214-1 and 214-2 share the curved profile 224.

In this manner, it is advantageous that when cable 204 is under tension, there may be a tendency for the BSR apparatus 208, cable 204, clamp 210 (not shown), and housing 214, as a system themselves or as part of the sensor station 202, to orient in an intended manner while passing over a capstan. For example, the curved profile 224 may make contact with the capstan. Further, this geometry to the housing sections 214-1 and 214-2 can enable cable 204 to be close to the capstan, such that stress enhancements associated with an interface between cable 204 and an offset of a rigid length from a surface of the capstan are impeded and reduced.

Figure 2D:
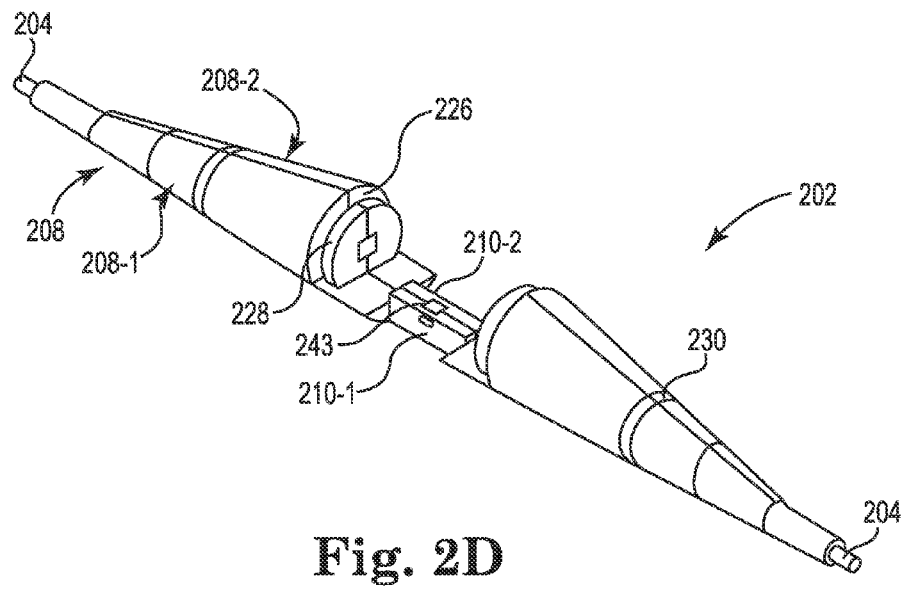
Figure 2E:
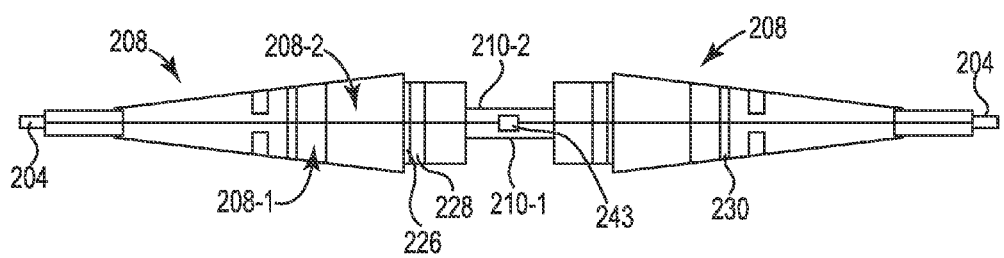
Figure 2F:
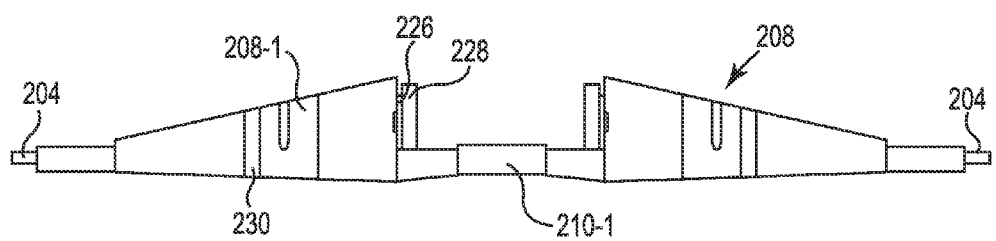

FIG. 2D illustrates an example perspective view of sensor station 202 with housing sections 214-1 and 214-2 removed, and the clamp 210 having clamp section 210-1 and 210-2 visible. FIG. 2E illustrates an example top view of sensor station 202 with housing sections 214-1 and 214-2 removed, and clamp sections 210-1 and 210-2 visible. FIG. 2F illustrates an example side view of sensor station 202 with housing sections 214-1 and 214-2 removed, and BSR apparatus section 208-1 and clamp section 210-1 visible. For ease of reference, FIGS. 2D-2F will be discussed together.

Figure 4A:
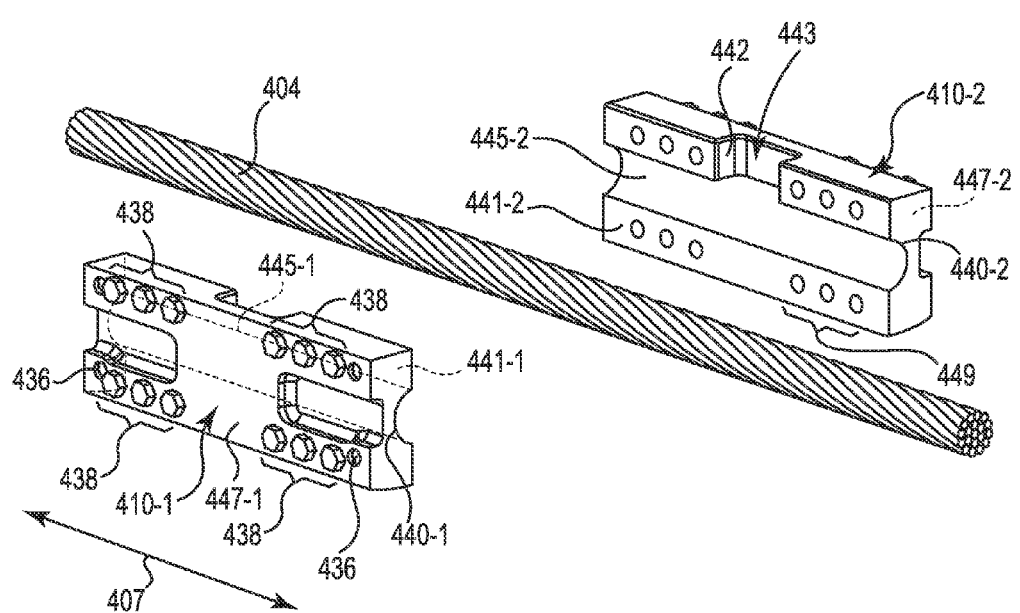
FIGS. 4A-4C illustrate example views of a clamp for attaching an apparatus to a cable.
Figure 4B:
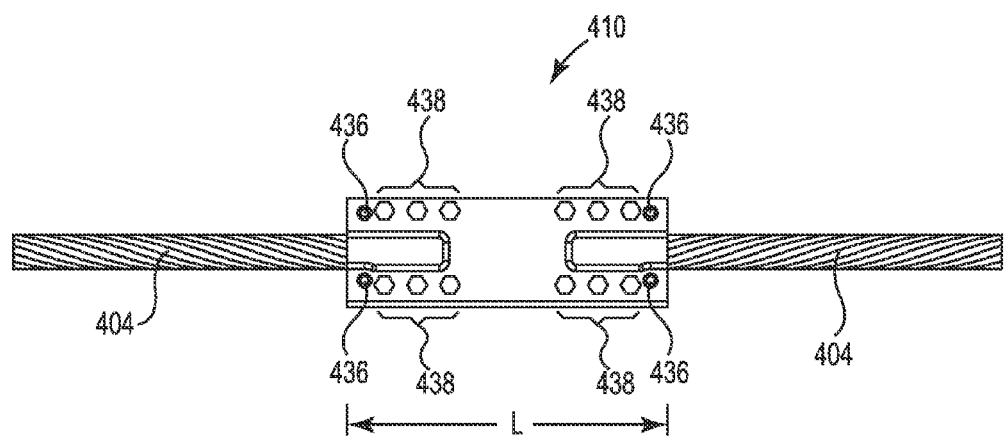
Figure 4C:
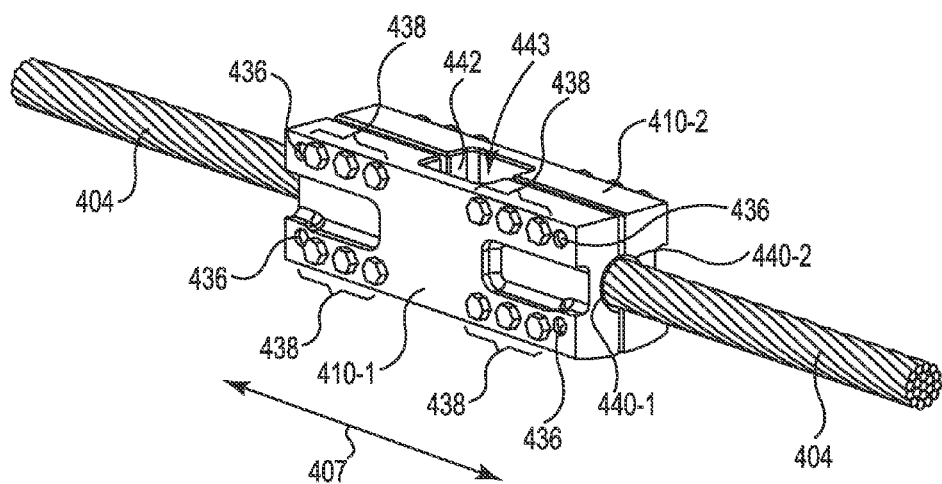

Clamp sections 210-1 and 210-2 can be around cable 204 (as described more in FIGS. 4A-4C). BSR apparatus sections 208-1 and 208-2 can be coupled around cable 204 and may be attached to clamp sections 210-1 and 210-2. As shown, BSR apparatus 208 may be attached, one to each side of the clamp 210. According to various embodiments, the BSR apparatus sections 208-1 and 208-2 are coupled to one another via a housing 214 (not shown), as shown in FIGS. 2A and 2B, and as will be discussed further in FIGS. 2G and 2H. In some embodiments, BSR apparatus sections 208-1 and 208-2 may be coupled using attachment rings 230 such as bands of steel or other suitable material.

In various embodiments, an opening 243 is provided to the clamp sections 210-1 and 210-2 such that a component associated with the cable 204 may be passed through the opening 243 to couple to an apparatus exterior to the clamp sections 210-1 and 210-2. In at least one embodiment, the component may be an optical fiber, and the opening 243 is configured to provide access to optical fibers associated with the cable 204 from an exterior of the clamp. And, in at least one embodiment, an apparatus exterior to the clamp sections 210-1 and 210-2 may include optical apparatus associated with a sensor station as part of a PRM system. In this manner, particular optical fibers along a longitudinal axis of the cable 204 may be broken out in a mechanically decoupled fashion. Additionally, an optical apparatus can be coupled to an optical fiber broken out from the cable 204.

Figure 2G:
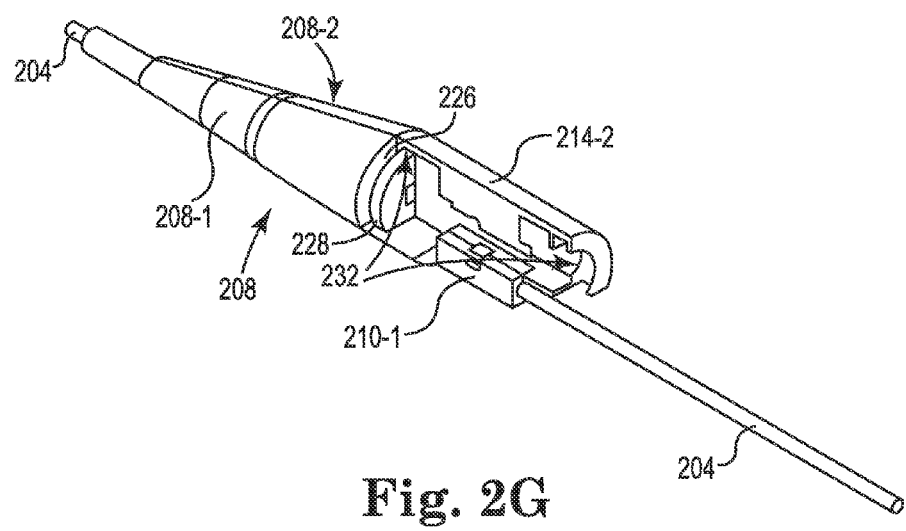
Figure 2H:
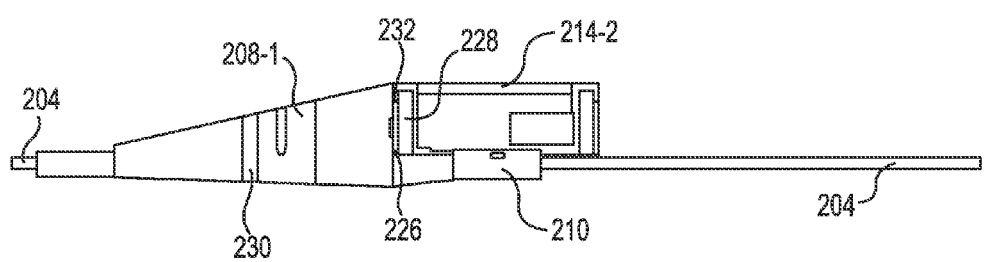

FIG. 2G illustrates an example perspective view of a portion of a sensor station showing BSR apparatus sections 208-1 and 208-2, clamp sections 210-1 and 210-2, and housing section 214-2 (housing section 214-1 of housing 214 removed) around a cable 204. FIG. 2H illustrates an example side view of a portion of a sensor station with housing section 214-1 removed. For ease of reference, FIGS. 2G-2H will be discussed together.

Housing sections 214-1 and 214-2 may be coupled to the clamp sections 210-1 and 210-2. However, according to various embodiments the housing sections can additionally couple to an exterior surface of BSR apparatus sections 208-1 and 208-2. As shown here, cable 204 can pass through the BSR apparatus 208 such that the BSR apparatus 208 surrounds the cable 204. A housing section, shown here as housing section 214-2, may partially surround the cable 204. According to various embodiments, the BSR apparatus sections 208-1 and 208-2 may be formed with a particular shape incorporated into an exterior surface of BSR apparatus sections 208-1 and 208-2.

In some embodiments, this particular shape to the exterior surface of the BSR apparatus sections 208-1 and 208-2 may be in the form of a groove 226 that is near an end of the BSR apparatus sections 208-1 and 208-2 that is proximal to the clamp sections 210-1 and 210-2. In at least one embodiment, the groove 226 is in the shape of a partial annulus. The groove 226 may be defined by a boundary that includes a flange 228 on the ends of the BSR apparatus sections 208-1 and 208-2 that extends radially outward.

In complement, housing sections 214-1 and 214-2 may include a flange 232 that extends radially inward from an exterior surface of the housing sections 214-1 and 214-2 to seat in the groove 226 of the BSR apparatus sections 208-1 and 208-2. In various embodiments, the BSR apparatus sections 208-1 and 208-2 and the housing sections 214-1 and 214-2 may have a cylindrical exterior surface such that the flange 232 extends radially inward from a concave exterior surface of the housing sections 214-1 and 214-2. In some embodiments, the groove 226 may have a width that may allow a predetermined range of travel laterally and/or longitudinally for the flange 232 of the housing sections 214-1 and 214-2, while otherwise restricting movement of the housing sections 214-1 and 214-2 relative to the BSR apparatus sections 208-1 and 208-2. Thus, when the housing sections 214-1 and 214-2 are coupled to the BSR apparatus sections, the flange 232 on the housing sections 214-1 and 214-2 can extend into the groove 226 on the surface of the BSR apparatus sections 208-1 and 208-2 to reduce movement of the BSR apparatus 208 relative to the housing 214. In this manner, the housing sections 214-1 and 214-2 may be more easily coupled to the BSR apparatus sections 208-1 and 208-2. In at least one embodiment, this manner of coupling the housing sections 214-1 and 214-2 to the BSR apparatus sections 208-1 and 208-2 may provide for easier assembling, may require fewer and less weighty and costly hardware, e.g., fewer metal screws, bolts and/or other fasteners, and may provide easier access for serviceability.

Figure 3A:
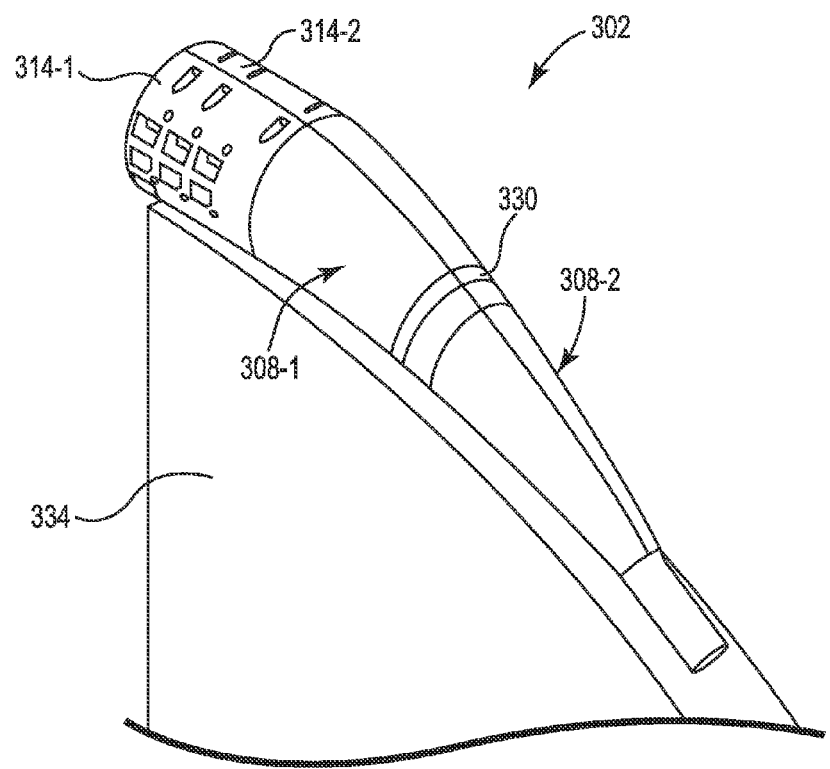
FIGS. 3A-3E illustrate example views of portions of a sensor station including a clamp and a bending strain relief (BSR) apparatus bent over a capstan while deploying.
Figure 3B:
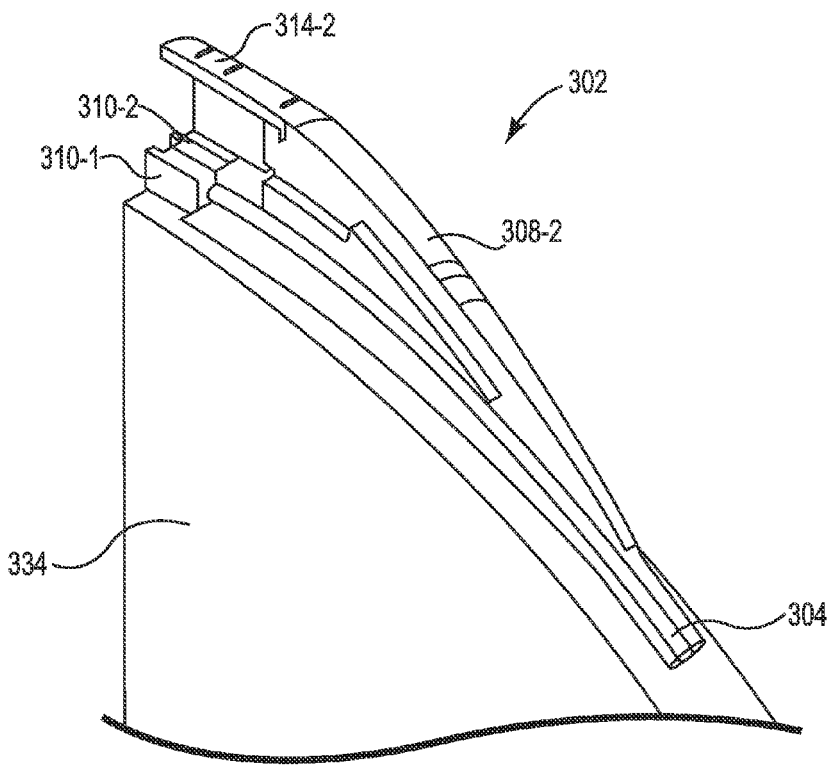

FIGS. 3A-3E illustrate example views of a portion of a sensor station 302 bent over a capstan 334. FIG. 3A illustrates an example perspective view of a portion of a sensor station 302 including assembled BSR apparatus sections 308-1 and 308-2 and housing sections 314-1 and 314-2 bent over capstan 334. FIG. 3B illustrates an example perspective view of the portion of a sensor station 302 with housing section 314-2 and BSR apparatus section 308-2 (housing section 314-1 and BSR apparatus section 308-1 removed), and clamp sections 310-1 and 310-2 shown. For ease of reference, FIGS. 3A-3B are discussed together. For purposes of seismic surveying, geophysical exploration, and/or PRM, cables may be retrieved or deployed using a pulley or capstan.

According to various embodiments, housing sections 314-1 and 314-2, BSR apparatus sections 308-1 and 308-2, and/or clamp sections 310-1 and 310-2 may reduce or prevent damage to a cable 304 by controlling a bend radius of the cable 304 during retrieval, deployment, other handling of the cable, and/or controlling exposure to environmental elements. As used herein, "bend radius" includes a radius measured to an inside curvature of a cable. As used herein, "minimum bend radius" includes a minimum radius a cable or equipment may bend without kinking or damaging the cable, equipment, or individual components. The smaller the minimum bend radius, the greater is the flexibility while still maintaining proper function and intended use. In at least one embodiment, BSR apparatus sections 308-1 and 308-2 may be coupled using attachment rings 330.

As described herein, clamp sections 310-1 and 310-2 and housing sections 314-1 and 314-2 may serve to connect additional apparatus to a cable 304 and to protect the additional apparatus and components associated with the cable 304. Thus, in at least one embodiment, a component may be an optical fiber associated with the cable 304 and an apparatus may be an optical apparatus associated with a sensor station to a PRM system. Clamp sections 310-1 and 310-2 may be coupled around cable 304 and may couple directly to the housing sections 314-1 and 314-2 and BSR apparatus sections 308-1 and 308-2.

Figure 3C:
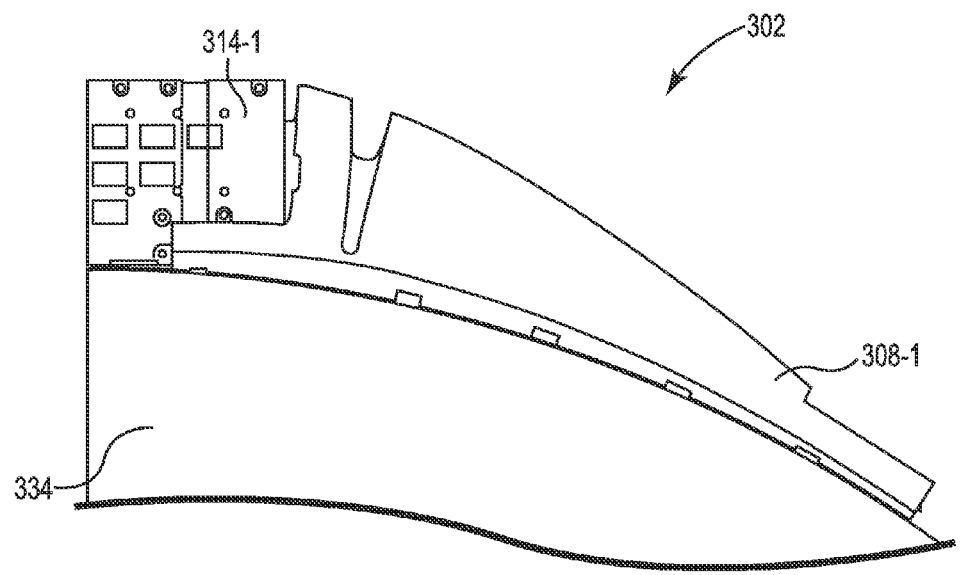
Figure 3D:
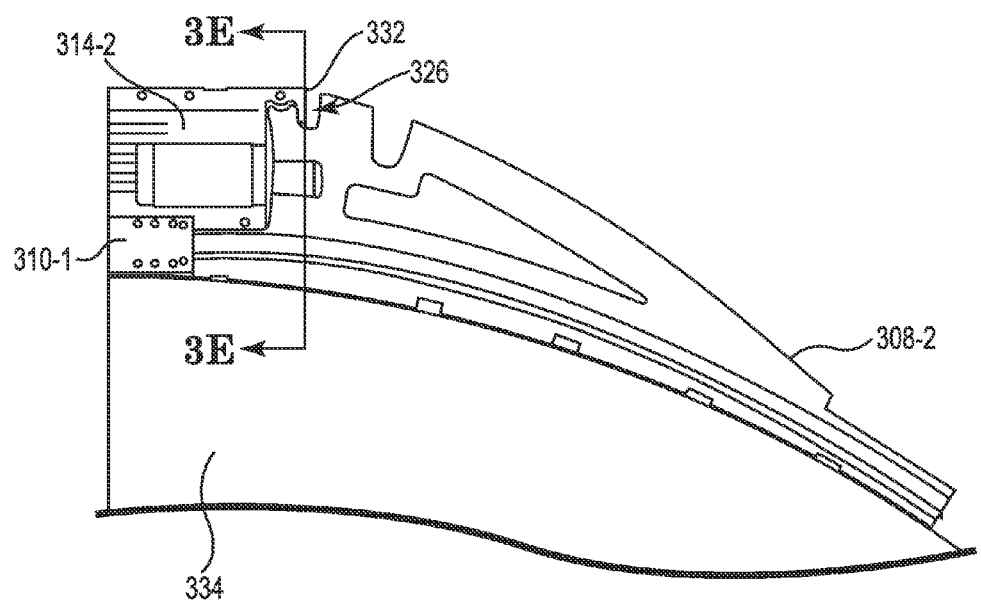

FIG. 3C illustrates an example side view of an assembled portion of a sensor station 302 bent over capstan 334 with housing section 314-1 and BSR apparatus section 308-1 viewable. FIG. 3D illustrates an example side view of the portion of the sensor station 302 bent over capstan 334 from FIG. 3C with housing section 314-1 and BSR apparatus section 308-1 removed (housing section 314-2, BSR apparatus section 308-2, and clamp section 310-1 viewable). FIG. 3D illustrates the flange 332 of housing section 314-2 seated in the groove 326 of BSR apparatus section 308-2. As noted above, in some embodiments a width of the groove 326 may be predetermined to provide a desired range of motion to the flange 332 when seated in the groove 326.

Figure 3E:
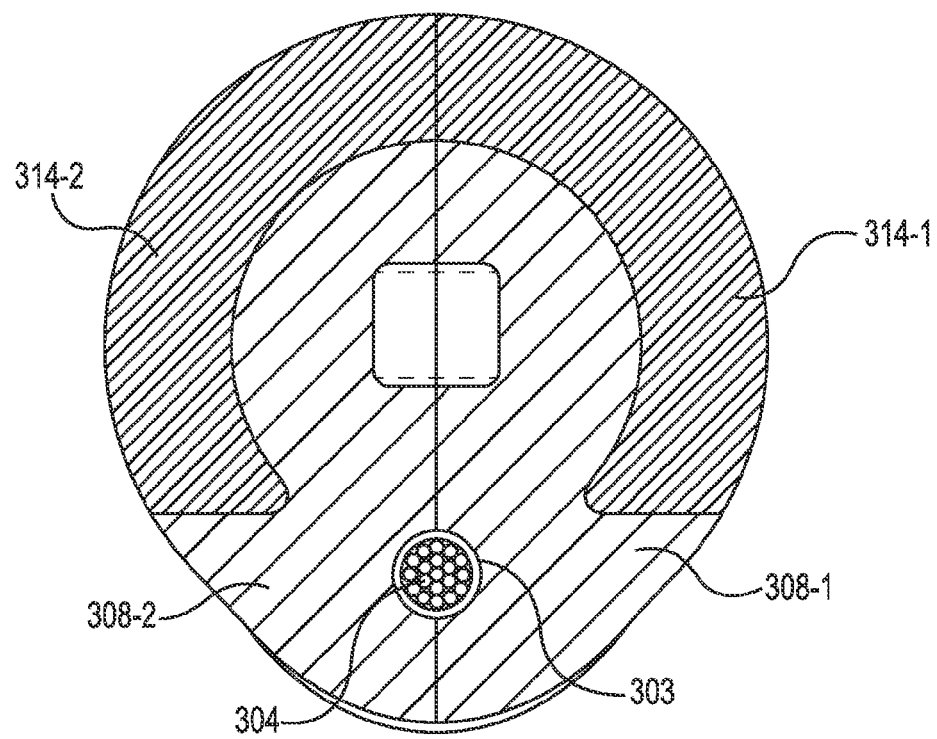

FIG. 3E illustrates an example cross sectional view of the portion of the sensor station 302 taken along cut-line 3E-3E in FIG. 3D. As shown in FIG. 3E, a cable 304 may pass through a cable cavity formed by BSR apparatus sections 308-1 and 308-2 when coupled. Housing sections 314-1 and 314-2 may couple, at least partially, around the BSR apparatus sections 308-1 and 308-2 and the cable 304.

When cable 304 is bent by external forces, a bending moment is imposed onto the cable 304 by the external forces. According to various embodiments, those forces may be transferred to the BSR apparatus sections 308-1 and 308-2 and housing sections 314-1 and 314-2. Embodiments of the present disclosure may reduce the movement of the BSR apparatus sections 308-1 and 308-2 relative to the housing sections 314-1 and 314-2 while under the influence of the bending moment. In at least one embodiment, it is advantageous that the flange-and-groove relationship between the housing sections 314-1 and 314-2 and BSR apparatus sections 308-1 and 308-2 (sometimes known as a tongue-and-groove design) may help to prevent the BSR apparatus 308 from moving away from the housing 314. Additionally, the flange-and-groove relationship between the housing sections 314-1 and 314-2 and BSR apparatus sections 308-1 and 308-2 may help to reduce rotation of the BSR apparatus 308 and the housing 314 around a longitudinal axis of the cable 304, and to reduce translation of the BSR apparatus 308 and the housing 314 in directions parallel and perpendicular to the longitudinal axis of the cable 304.

FIGS. 4A-4C illustrate views of a clamp 410 for attaching a structure to a cable 404. FIG. 4A is an exploded view of the clamp 410 showing that, in some embodiments, the clamp 410 can include a first clamp section 410-1 and a second clamp section 410-2. Each of the first and the second clamp sections 410-1 and 410-2 includes a first surface 441-1 and 441-2, respectively. Each first surface 441-1 and 441-2 can include a channel, 445-1 and 445-2 respectively, along a longitudinal axis 407 of the cable 404 and the clamp 410. In at least one embodiment, the channel 445-1 and 445-2 in the first surface 441-1 and 441-2 of the first and the second clamp sections 410-1 and 410-2 has a depth equal to or less than a radius of the cable. In at least one embodiment, channel 445-1 and 445-2 may receive the cable in the first and the second clamp sections 410-1 and 410-2.

Each of the first and the second clamp sections 410-1 and 410-2 can include a second surface, 447-1 and 447-2, respectively, opposite the first surfaces 441-1 and 441-2. A third surface 442 may be provided orthogonal to the first surfaces 441-1 and 441-2 and second surfaces 447-1 and 447-2 respectively (shown as 442 in clamp section 410-2). The third surface 442 may be disposed between the first and second surfaces and extend between an exterior of the clamp sections 410-1 and 410-2 and the channels 445-1 and 445-2 in the first surfaces 441-1 and 441-2. In at least one embodiment the third surface 442 may provide an opening 443 from an exterior of the clamp sections 410-1 and 410-2 to the channels 445-1 and 445-2 in the first surfaces 441-1 and 441-2 when the first clamp section 410-1 and the second clamp section 410-2 are joined. Put another way, the opening 443 provides access to the cable from the exterior of the clamp. In at least one embodiment, the opening 443 can be formed by a first recessed portion from an exterior of the first clamp section 410-1 and a second recessed portion from an exterior of the second clamp section 410-2. The opening 443 may allow an apparatus exterior to the clamp 410 to couple to the cable 404. For example, at least one component of the cable 404 may be passed through the opening 443 to couple to an apparatus exterior to the clamp 410. In at least one embodiment, the apparatus may be an apparatus associated with a sensor station to a PRM system. And, in at least one embodiment the at least one component of the cable 404 may be an optical fiber associated with the cable 404. In this manner the opening 443 is configured to access to one or more optical fibers associated with the cable 404 from an exterior of the clamp 410.

As shown in the example exploded view of FIG. 4A, each of the clamp sections 410-1 and 410-2 may include a plurality of apertures 449 that extend through the clamp sections 410-1 and 410-2 from the second surfaces 447-1 and 447-2 to the first surfaces 441-1 and 441-2 of the clamp sections 410-1 and 410-2 outside of the channels 445-1 and 445-2 on the first surfaces 441-1 and 441-2. When the two clamp sections 410-1 and 410-2 are coupled, the channels 445-1 and 445-2 to the first surfaces 441-1 and 441-2 are oppositely aligned. Additionally, the first and second recessed portions formed by the third surfaces 442, substantially orthogonal to the first surfaces 441-1 and 441-2 and second surfaces 447-1 and 447-2, can be oppositely aligned and to form the opening 443 in the clamp 410 when the example two clamp sections 410-1 and 410-2 are joined about the cable 404.

In some embodiments, the channels 445-1 and 445-2 may be coated with a grit, wherein the coating may be partial or complete, but covering at least about 30% of the surface area. The grit can be a partial or complete layer of silicon carbide particles provided to the channels 445-1 and 445-2 to increase a friction imposed by the clamp sections 410-1 and 410-2 when coupled around the cable 404. In some embodiments the clamp sections 410-1 and 410-2 can be coupled around the cable 404 by one or more bolts 438 passing through each of the plurality of apertures 449 to the clamp sections 410-1 and 410-2. In this manner the clamp sections 410-1 and 410-2 of the clamp may be removable from the cable 404. When the first and the second clamp sections 410-1 and 410-2 are coupled, a respective bolt 438 can pass through each of the plurality of apertures 449 of the clamp sections 410-1 and 410-2, securing the first surface 441-1 of the clamp section 410-1 against the first surface 441-2 of the clamp section 410-2 around the cable 404.

FIG. 4B illustrates an example side view of the clamp 410 with bolts 438 joining the clamp 410 along a longitudinal length (L) around the cable 404. FIG. 4C illustrates an example perspective view of clamp sections 410-1 and 410-2 joined along a longitudinal length, with bolts 438, around the cable 404. In various embodiments, the clamp sections 410-1 and 410-2 can be oriented substantially symmetrically around the cable 404 when coupled together. As used herein, "substantially" means that a characteristic need not be absolute, but is close enough to the absolute characteristic so as to achieve the advantages of the characteristic.

As further shown in the example views of FIG. 4A-4C, each of the clamp sections 410-1 and 410-2 can have one or more attachment mechanisms 436 by which an apparatus can be attached to the clamp 410. In some embodiments the attachment mechanism 436 may be one or more threaded holes configured to enable one or more apparatus, external to the clamp 410, to be attached thereto. In some instances, the apparatus may include sections to a housing and/or BSR apparatus. Sections to the BSR apparatus and/or sections to the housing have been described in connection with FIGS. 2A-2H and 3A-3E. In one example, screws may be used to couple the apparatus to attachment mechanisms 436 on the second surfaces 447-1 and 447-2 of the clamp sections 410-1 and 410-2. In this manner, the BSR apparatus and housing, coupled with the clamp and cable, may be more easily assembled and may allow for more easy access and serviceability.

The example clamp sections 410-1 and 410-2 of clamp 410 can be made out of metal. Other alloys, plastics or other sufficiently strong materials may also be suitable. A partial or complete layer of grit, for instance small silicon carbide particles, may be placed in the channels 445-1 and 445-2 of the clamp sections 410-1 and 410-2. In some embodiments the grit may be held in place using an adhesive. Channels 445-1 and 445-2 may be coated with the adhesive. As mentioned above, each of the clamp sections 410-1 and 410-2 can include a plurality of apertures 449 through which a fastener such as bolts 438 may extend. The plurality of apertures 449 may be aligned such that the clamp sections 410-1 and 410-2 may be coupled with the bolts 438 around the cable 404. Such a fastening mechanism, when tightened, can impose a force on an exterior surface of the cable 404, in a direction substantially perpendicular to the longitudinal axis 407 of the cable 404. This force, along with the grit and/or adhesive in the channels 445-1 and 445-2, may provide significant frictional force for attachment strength between the clamp 410 and the cable 404.

Particles in the grit are from around 60 microns to around 100 microns in diameter, in some instances, and can cause a high coefficient of friction to occur between a surface of the channels 445-1 and 445-2 and an exterior surface of the cable 404. In at least one embodiment, particles in the grit have a diameter of 80 microns. In some embodiments the grit particles may be harder than a steel material used in cable 404. As such, particles of the grit can embed themselves partially into the exterior surface of the cable 404 when the clamp 410 is coupled around the cable 404. In some embodiments, the grit may provide an additional friction force between the cable 404 and the clamp 410 relative to the frictional force provided only by coupling the clamp sections 410-1 and 410-2 around the cable 404 without the grit in the channels 445-1 and 445-2. For example, the grit may provide additional resistance that may enhance a coefficient of friction between the clamp 410 and the cable 404. This may advantageously cause an attachment strength between the cable 404 and the clamp 410 to be high enough for the clamp 410 to withstand the external forces imposed on it by an apparatus attached to the clamp 410 and/or by surrounding environmental forces.

In some examples, an even higher attachment force to increase frictional force than what has been described in the above frictional forces may be desired. The attachment force may be from around 3 to 4.5 kilonewtons along a cable axis. In at least one embodiment, the strength is 3.9 kilonewtons. Thus, alternatively or in addition to the grit, an adhesive material can be used. For instance, an epoxy resin can be injected into openings and/or upon surfaces of the clamp sections 410-1 and 410-2. In some embodiments an epoxy resin composition may be injected into openings to the channels 445-1 and 445-2 as the clamp sections 410-1 and 410-2 are coupled around the cable 404. In this manner, a time needed for curing and/or labor and material costs may be reduced.

In some embodiments the epoxy resin may include a glass filler to enhance an attachment force between the cable 404 and the clamp 410. As such, the adhesive material may spread into the clamp channels 445-1 and 445-2, creating a mechanical interference, such that a solid glass-like material sits between cable 404 and clamp 410. This may provide an additional attachment force to that which would be provided if only attaching the clamp sections 410-1 and 410-2 with the bolts 438. In some embodiments, the grit may be used up to or at depths greater than 1,400 meters and an adhesive material may be used up to or at depths greater than 1,400 meters.

Figure 5A:
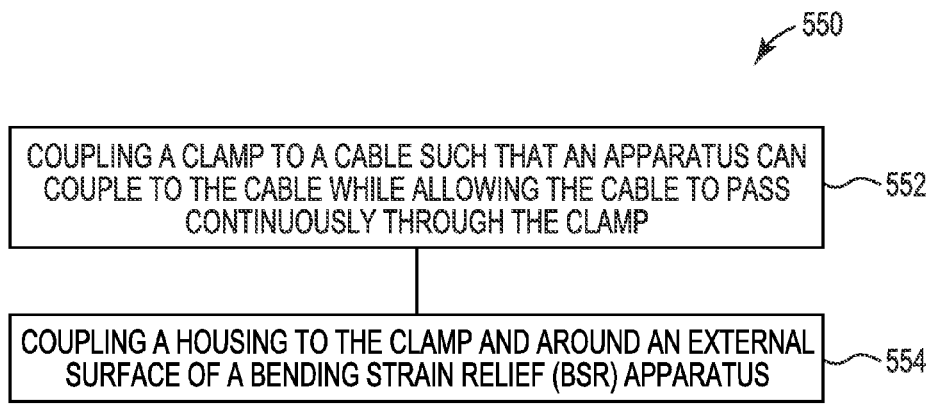
FIGS. 5A-5E illustrate example method flow diagrams for assembling a clamp, cable, and bending strain relief (BSR) apparatus using a housing.

FIGS. 5A-5D illustrate example method flow diagrams for assembling a clamp, cable, and bending strain relief (BSR) apparatus using a housing. FIG. 5A illustrates an example method flow diagram 550 for assembling a clamp, cable, and a BSR apparatus using a housing. For example, at block 552 the method can include coupling a clamp to a cable such that an apparatus couples to the cable while allowing the cable to pass continuously through the clamp. At block 554 the example method can include coupling a housing to the clamp and the cable around an external surface of a BSR apparatus. The clamp, BSR apparatus, and housing may include those examples described above. According to embodiments, the housing is configured to at least partially reduce movement of the BSR apparatus relative to the housing. In some embodiments a flange on the housing extends radially inward to couple to a groove on an exterior surface of the BSR apparatus to at least partially reduce movement of the BSR apparatus relative to the housing. The groove may be a partial annulus on each of two sections to the housing as the same has been described herein.

Figure 5B:
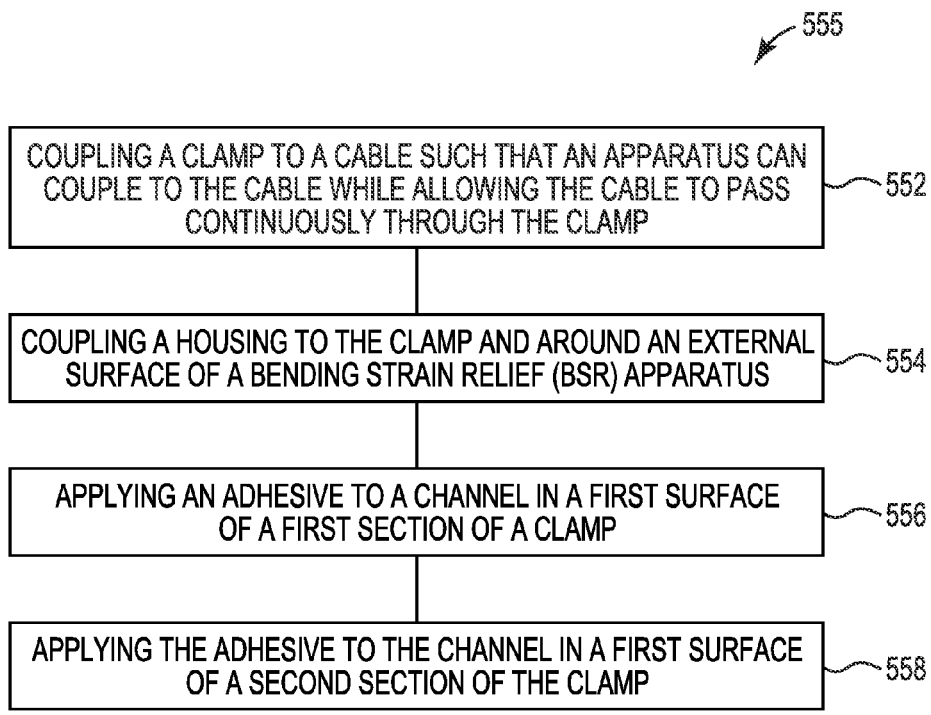

FIG. 5B illustrates an example method flow diagram 555 for assembling a clamp, cable, and a BSR apparatus using a housing. For example, at block 552 the method can include coupling a clamp to a cable such that an apparatus couples to the cable while allowing the cable to pass continuously through the clamp. At block 554 the example method can include coupling a housing to the clamp and the cable around an external surface of a BSR apparatus. At block 556, the method may include applying an adhesive to a channel in a first surface of a first section of a clamp and applying the adhesive to a channel in a first surface of a second section of a clamp. The adhesive may include an epoxy composition. At block 558, the method may include applying a partial or complete layer of adhesive to the channels in first and the second sections. In some embodiments the grit may include silicon carbide particles.

Figure 5C:
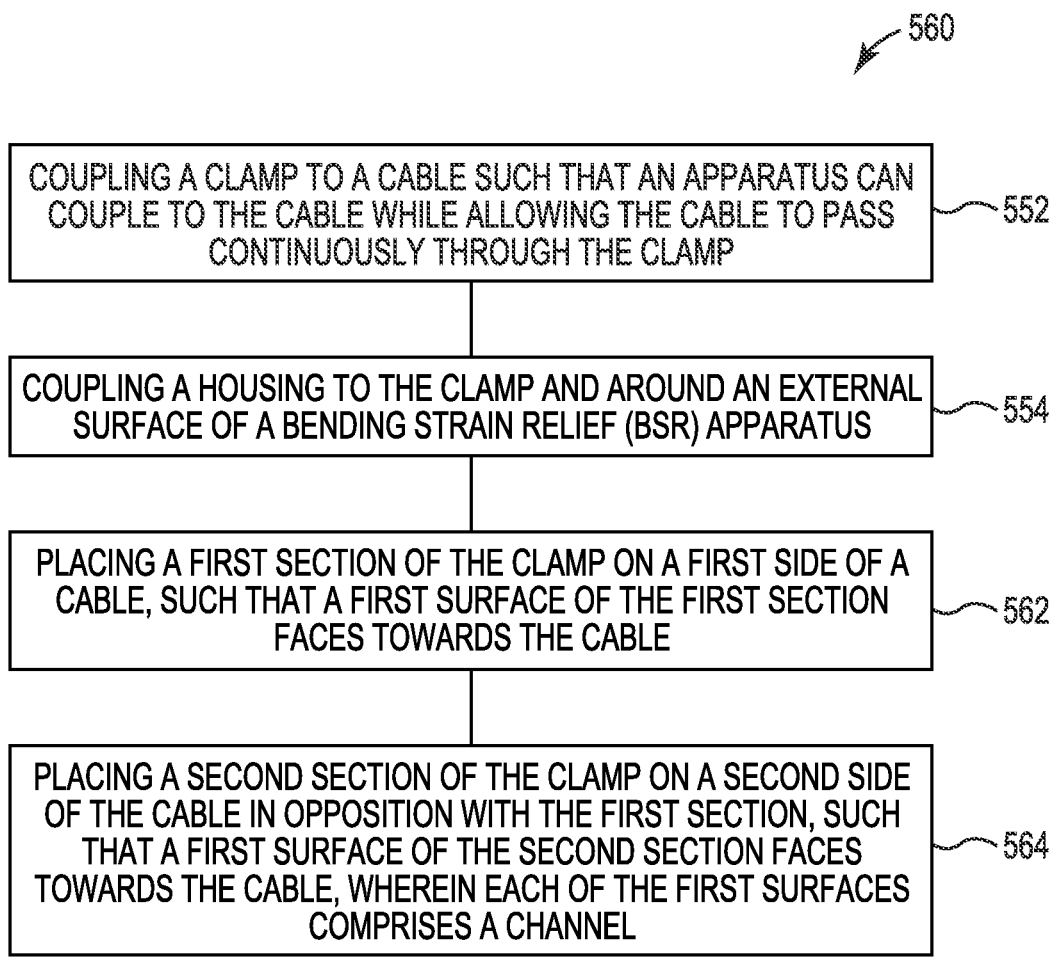

FIG. 5C illustrates an example method flow diagram 560 for assembling a clamp, cable, and a BSR apparatus using a housing. For example, at block 552 the method can include coupling a clamp to a cable such that an apparatus couples to the cable while allowing the cable to pass continuously through the clamp. At block 554 the example method can include coupling a housing to the clamp and the cable around an external surface of a BSR apparatus. At block 562, the method may include placing a first section of the clamp, having a channel, on a first side of a cable, such that the first surface of the first section faces towards the cable. At block 564, the method may include placing a second section of the clamp, having a channel, on a second side of the cable in opposition with the first section, such that a first surface of the second section faces towards the cable, wherein each of the first surfaces comprises a channel.

Figure 5D:
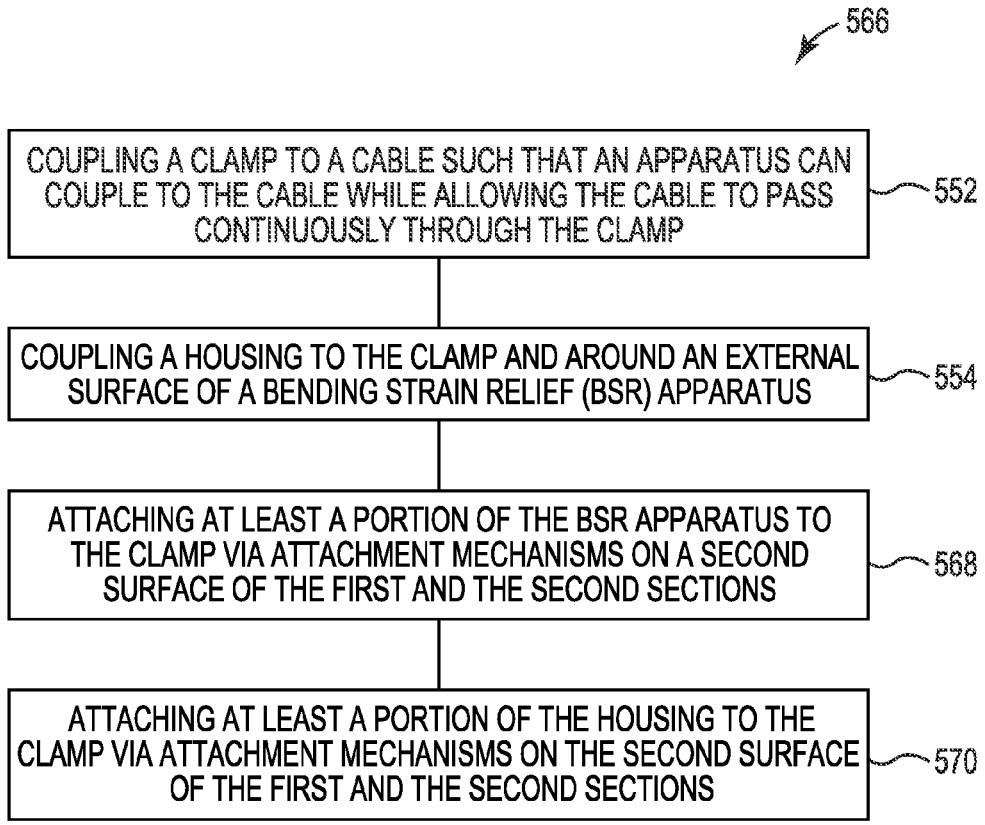
Figure 5E:
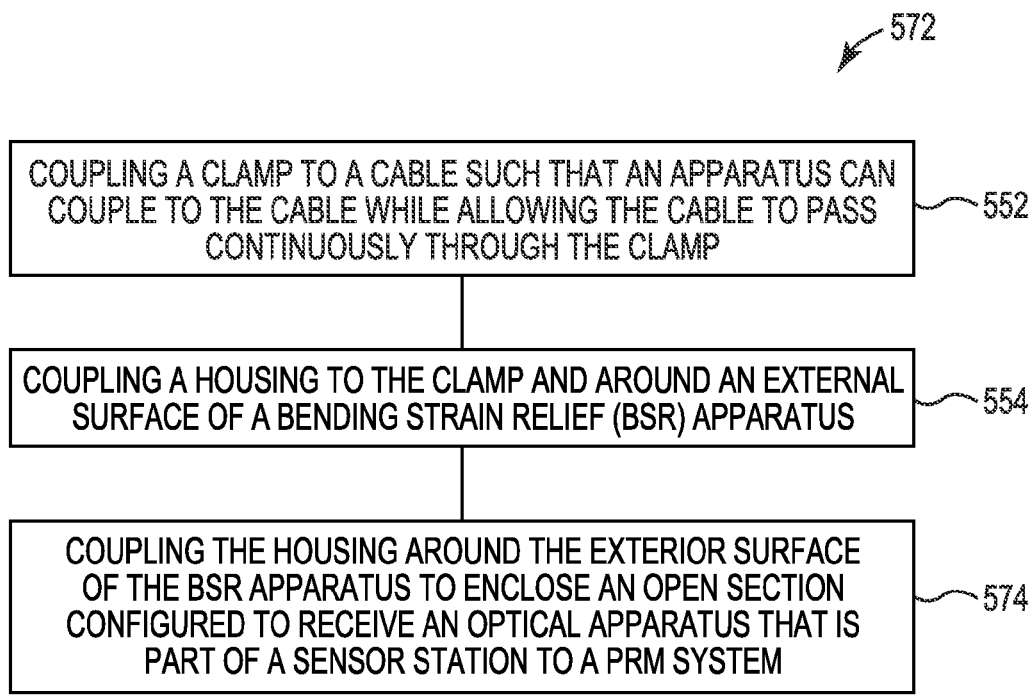

FIG. 5D illustrates an example method flow diagram 566 for assembling a clamp, cable, and a BSR apparatus using a housing. For example, at block 552 the method can include coupling a clamp to a cable such that an apparatus couples to the cable while allowing the cable to pass continuously through the clamp. At block 554 the example method can include coupling a housing to the clamp and the cable around an external surface of a BSR apparatus. At block 568, the method may further include attaching at least a portion of the BSR apparatus to the clamp via attachment mechanisms on a second surface of the first and the second sections and at block 570, attaching at least a portion of the housing to the clamp via attachment mechanisms on the second surface of the first and the second sections. In at least one embodiment coupling the clamp to the cable can include coupling the clamp to the cable such that at least one component can be passed through an opening in the clamp to couple an apparatus, exterior to the clamp, to the cable. For example, the opening may be configured to provide access to optical fibers associated with the cable from an exterior of the clamp. FIG. 5E illustrates an example method flow diagram 572 for assembling a clamp, cable, and a BSR apparatus using a housing. For example, at block 552 the method can include coupling a clamp to a cable such that an apparatus couples to the cable while allowing the cable to pass continuously through the clamp. At block 554 the example method can include coupling a housing to the clamp and the cable around an external surface of a BSR apparatus. At block 574, coupling a housing to the clamp and the cable around an exterior surface of a BSR apparatus can include coupling the housing to provide an open section within the housing such that the open section is configured to receive an optical apparatus that is part of a sensor station to a PRM system.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system, comprising:
    a clamp coupled to a cable, wherein the clamp is configured to couple a sensor station apparatus to the cable while allowing the cable to pass continuously through the clamp;
    a bending strain relief (BSR) apparatus coupled to the clamp and the cable by a housing and comprising:
        a first section comprising a groove to couple the first section of the BSR apparatus to a first section of the housing; and
        a second section coupled to the first section of the BSR apparatus and comprising a groove to couple the second section of the BSR apparatus to a second section of the housing.

2. The system of claim 1, wherein the housing is coupled to the BSR apparatus such that movement of the BSR apparatus relative to the housing is restricted.

3. The system of claim 1, wherein the clamp is removable.

4. The system of claim 1, wherein the clamp comprises an opening, and wherein:
    a different sensor station apparatus is coupled to the clamp; and
    at least one component of the cable may be passed through the opening to couple to the third apparatus to the cable.

5. The system of claim 1, wherein the clamp further comprises:
    a first section coupled to a second section, wherein when coupled, the first and the second sections are coupled around the cable;
    an opening formed by a first recessed portion of the first section and a second recessed portion of the second section, wherein the opening is configured to receive optical fibers associated with the cable; and
    a first channel on the first section and a second channel on the second section configured to receive the cable in the first and the second sections.

6. The system of claim 5, wherein the opening provides access to one or more optical fibers associated with the cable from an exterior of the clamp.

7. The system of claim 5, wherein the first and the second channels are coated with a grit.

8. The system of claim 5, wherein the first and the second channels are coated with an adhesive.

9. The system of claim 1, further comprising:
    a bottom portion of the first section of the housing having a curved profile; and a bottom portion of the second section of the housing having the curved profile, such that when the first and second sections are joined, the bottom portions of the first and the second sections share the curved profile.

10. The system of claim 1, wherein the first and the second sections of the BSR apparatus are additionally coupled by rings.

11. A system, comprising:
a clamp coupled to a cable;
a housing; and
a BSR apparatus coupled to the clamp and the cable, wherein the BSR apparatus comprises:
a first section comprising a groove to couple the first section of the BSR apparatus to a first section of the housing; and
a second section coupled to the first section of the BSR apparatus and comprising a groove to couple the second section of the BSR apparatus to a second section of the housing,
wherein the groove of the first section of the BSR apparatus couples to a flange extending radially inward from a surface of the first section of the housing and the groove of the second section of the BSR apparatus couples to a flange extending radially inward from a surface of the second section of the housing.

12. The system of claim 11, wherein the clamp comprises a first and a second section, wherein each of the first and the second sections comprises:
a first surface including a channel along a longitudinal length of the first surface, wherein the channel has a depth which is equal to or less than a radius of the cable; and
a second surface opposite the first surface, wherein the second surface includes a plurality of apertures that extend from the second surface to the first surface outside of the channels.

13. The system of claim 12, wherein, when the first and the second sections of the clamp are coupled, an opening is formed along a third surface to the first and the second sections of the clamp to provide access to the cable from an exterior of the clamp.

14. The system of claim 12, wherein the channel is coated with a grit.

15. The system of claim 14, wherein, when the first and the second sections of the clamp are coupled, a respective bolt passes through each of the plurality of apertures of the first and the second sections of the clamp securing the first surface of the first section of the clamp to the first surface of the second section of the clamp.

16. The system of claim 15 wherein the grit is silicon carbide particles.

17. The system of claim 12, wherein, when coupled, the first and the second sections of the clamp are oriented substantially symmetrically around the cable.

18. The system of claim 12, wherein at least one of the first and the second sections of the clamp has an attachment mechanism on the respective second surface configured to enable a different apparatus to be attached to the clamp.

19. A system, comprising:
a clamp coupled to a cable;
a bending strain relief (BSR) apparatus having a longitudinal axis, the BSR apparatus comprising:

a first section comprising:
a cable cavity positioned along the longitudinal axis near a bottom surface of the BSR apparatus, the cable cavity configured to enclose a longitudinal length of cable; and
an open section configured to receive optical apparatus along a length of the longitudinal axis of the BSR apparatus; and
a groove in an exterior surface at an end of the open section and transverse to the longitudinal axis to couple the first section of the BSR apparatus to a first section of a housing; and
a second section coupled to the first section; and
the housing configured to couple the first and the second sections of the BSR apparatus to the clamp and the cable, wherein the housing comprises:
an outer structure that extends between opposite ends of the open section; and
a flange extending from an end of the first section of the housing to couple to the groove of the first section of the BSR apparatus.

20. The system of claim 19, wherein the groove is a partial annulus to the exterior surface of the BSR apparatus.

21. The system of claim 19, wherein the BSR apparatus is formed from the first and the second BSR apparatus sections extending along the longitudinal axis, wherein the two sections form the cable cavity when the two sections are joined together.

22. The system of claim 19, wherein the housing is formed from the first and the second housing sections that when joined provide outer structure that extends longitudinally between the opposite ends of the open section and along a partial circumference of the open section.

23. The system of claim 22, wherein the partial circumference corresponds to the groove.

24. The system of claim 22, wherein the two housing sections are coupled at least partially by the flange on the first section of the housing extending radially inwardly to couple to the groove of the first section of the BSR apparatus at an end of the open section.

25. The system of claim 19, wherein the optical apparatus is part of a sensor station to a permanent reservoir monitoring (PRM) system.

26. A method, comprising:
coupling a clamp to a cable such that a first apparatus couples to the cable while allowing the cable to pass continuously through the clamp;
coupling a housing to the clamp and the cable around an exterior surface of a second apparatus, wherein the second apparatus is a bending strain relief (BSR) apparatus;
coupling a first section of the BSR apparatus to a first section of the housing via a groove in a first section of the BSR apparatus; and
coupling a second section of the BSR apparatus to a second section of the housing via a groove in a second section of the BSR apparatus.

27. The method of claim 26, wherein the method further comprises:
coupling a flange extending radially inward from a surface of the first section of the housing to the groove of the first section of the BSR, wherein the groove is on an exterior surface of the first section of the BSR apparatus; and
coupling a flange extending radially inward from a surface of the second section of the housing to the groove of the second section of the BSR, wherein the groove is on an exterior surface of the second section of the BSR apparatus.

28. The method of claim 26, wherein the method further comprises:
applying an adhesive to a channel in a first surface of a first section of a clamp; and
applying the adhesive to the channel in a first surface of a second section of the clamp.

29. The method of claim 28, wherein applying the adhesive comprises applying an epoxy resin.

30. The method of claim 26, wherein the method comprises:
applying grit to a channel in a first surface of a first section of a clamp; and
applying the grit to the channel in a first surface of a second section of the clamp.

31. The method of claim 30, wherein applying the grit comprises applying a layer of silicon carbide particles.

32. The method of claim 26, wherein the method comprises:
placing a first section of the clamp on a first side of a cable, such that a first surface of the first section faces towards the cable; and
placing a second section of the clamp on a second side of the cable in opposition with the first section, such that a first surface of the second section faces towards the cable, wherein each of the first surfaces comprises a channel.

33. The method of claim 32, wherein the method comprises:
attaching at least a portion of the BSR apparatus to the clamp via attachment mechanisms on a second surface of the first and the second sections; and
attaching at least a portion of the housing to the clamp via attachment mechanisms on the second surface of the first and the second sections.

34. The method of claim 26, wherein coupling a housing to the clamp and the cable around an exterior surface of the bending strain relief BSR apparatus comprises:
coupling the housing around the exterior surface of the BSR apparatus to enclose an open section configured to receive an optical apparatus that is part of a sensor station to a permanent reservoir monitoring (PRM) system.

* * * * *